(12) United States Patent
Sivasubramanian et al.

(10) Patent No.: US 9,953,351 B1
(45) Date of Patent: Apr. 24, 2018

(54) MANAGING RESOURCE REQUESTS THAT EXCEED RESERVED RESOURCE CAPACITY

(71) Applicant: Amazon Technologies, Inc., Reno, NV (US)

(72) Inventors: Swaminathan Sivasubramanian, Seattle, WA (US); Stefano Stefani, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 709 days.

(21) Appl. No.: 13/799,386

(22) Filed: Mar. 13, 2013

(51) Int. Cl.
G06Q 30/02 (2012.01)
H04M 15/00 (2006.01)
H04L 29/08 (2006.01)

(52) U.S. Cl.
CPC .......... *G06Q 30/0283* (2013.01); *H04L 67/10* (2013.01); *H04M 15/882* (2013.01)

(58) Field of Classification Search
None
See application file for complete search history.

(56) References Cited

U.S. PATENT DOCUMENTS

| | | | |
|---|---|---|---|
| 7,228,354 B2 | 6/2007 | Chambliss et al. | |
| 7,817,562 B1 * | 10/2010 | Kemeny | H04L 43/06 370/241 |
| 8,250,197 B2 | 8/2012 | Gulati et al. | |
| 8,606,924 B2 * | 12/2013 | Gujral | G06F 9/5072 370/254 |
| 2004/0111308 A1 | 6/2004 | Yakov | |
| 2006/0167703 A1 | 7/2006 | Yakov | |
| 2007/0005192 A1 * | 1/2007 | Schoettle | H02J 9/062 700/286 |
| 2007/0297328 A1 | 12/2007 | Semret et al. | |
| 2009/0254383 A1 | 10/2009 | Semret et al. | |
| 2010/0076805 A1 | 3/2010 | Batsakis et al. | |
| 2011/0138051 A1 | 6/2011 | Dawson et al. | |

(Continued)

OTHER PUBLICATIONS http://www.cnet.com/news/verizon-confirms-tiered-data-plans-and-hot-spot-charge-for-july-7/, 2011.*

(Continued)

*Primary Examiner* — Allen C Chein
(74) *Attorney, Agent, or Firm* — Robert C. Kowert; Meyertons, Hood, Kivlin, Kowert & Goetzel, P.C.

(57) ABSTRACT

A computer system that provides clients access to pooled resources in order to provide computing or data storage services may receive service requests (which explicitly or implicitly include requests for pooled resources), may service at least some of those requests, and may determine pricing for the serviced requests. The pricing for each request may be dependent on whether it was serviced using a portion of a resource pool that was reserved for the use of the client on whose behalf it was received or using burst capacity (e.g., unreserved or otherwise idle capacity within the resource pool). Pricing for the use of reserved capacity may be fixed, regardless of the amount of reserved capacity used. Pricing for burst capacity may depend on actual use, and may be demand-based (e.g., using a spot-market-based dynamic pricing model). Clients with reserved capacity may optionally request access to burst capacity.

20 Claims, 9 Drawing Sheets

(56) References Cited

U.S. PATENT DOCUMENTS

| | | | |
|---|---|---|---|
| 2011/0231212 A1* | 9/2011 | Hurley | G06Q 10/02 |
| | | | 705/5 |
| 2012/0131591 A1 | 5/2012 | Moorthi et al. | |
| 2012/0191536 A1* | 7/2012 | Chen | G06Q 30/02 |
| | | | 705/14.49 |
| 2012/0226808 A1* | 9/2012 | Morgan | G06F 9/5072 |
| | | | 709/226 |
| 2012/0330954 A1 | 12/2012 | Sivasubramanian et al. | |
| 2014/0075034 A1* | 3/2014 | Vasudevan | H04L 41/5054 |
| | | | 709/226 |
| 2014/0164623 A1* | 6/2014 | Galan | G06Q 10/06 |
| | | | 709/226 |

OTHER PUBLICATIONS

U.S. Appl. No. 14/701,464, filed Apr. 30, 2015, Tarang Gupta.
U.S. Appl. No. 14/701,462, filed Apr. 30, 2015 Jacob David Luszcz, et al.
U.S. Appl. No. 13/247,846 , filed Sep. 28, 2011, Brian Helfrich et al.
U.S. Appl. No. 13/431,360, filed Mar. 27, 2012, David John Ward Jr.
U.S. Appl. No. 13/475,359, filed May 18, 2012, David John Ward Jr.

* cited by examiner

MANAGING RESOURCE REQUESTS THAT EXCEED RESERVED RESOURCE CAPACITY

BACKGROUND

Some systems that provide services to customers (including access to computing resources or storage services) provide "instances" of the computing or storage resources required to satisfy various service requests through resource pools. Different resource pools may include instances of different types of resources and/or resources having different capabilities and/or performance specifications. For example, these systems may manage a pool of database connections, CPU cycles, heap memory, or throughput capacity (e.g., in terms of input/output operations). Such systems typically allow customers to submit a resource request or a request to perform an operation that requires the use of a particular amount of a pooled resource. If the requested amount of the pooled resource is available, the system accepts and services the request (i.e., the requested operation is performed). Otherwise, the request is rejected.

In some systems, if it is not possible to satisfy multiple resource requests that are received within a given time period from one or more customers, at least some of the requests are rejected. In other words, when the demand for resources exceeds the supply, incoming requests are throttled. In some cases, the system returns an error message to the customers indicating that their requests exceed the capacity of the resource pool and that they need to reduce the rate at which they submit requests in the future.

In some systems, customers are able to reserve a portion of a resource pool for their exclusive use. In return for this exclusive access, the customers are typically charged for the total amount of reserved resources (i.e., their reserved capacity) on a flat-fee basis for a given period of time (i.e., regardless of the amount of the reserved capacity that is actually being used by the customer at any given point during that period time). In other systems, customers are charged only for the resources they actually consume, but there are no guarantees that pooled resources will be available when customers need them.

Figure 1:
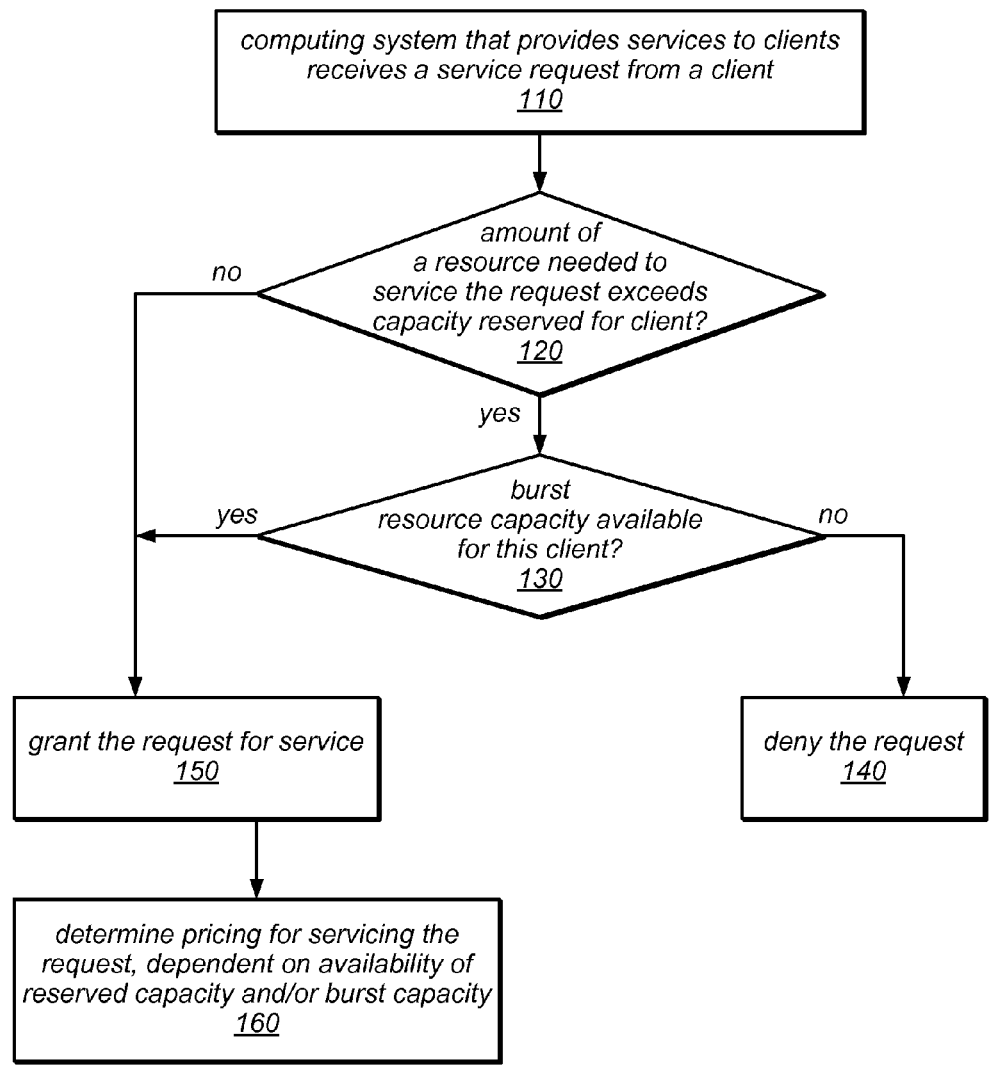
FIG. 1 is a flow diagram illustrating one embodiment of a method for handling service requests received from a client.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

The computer systems described herein for providing services (including access to pools of computing resources and/or storage resources) to clients may in some embodiments be configured to adaptively determine which and/or how many requests for resource instances are granted and/or terminated by the system (or service) as demand changes, and to determine the prices that clients will be charged for the use of those resource instances if and when their requests are granted. For example, in different embodiments, the computer systems described herein may be configured to manage pools of database connections, CPU cycles, heap memory, throughput capacity (e.g., in terms of input/output operations, or IOPS) or, in general, any type of pooled computing or storage resources that can be accessed by multiple processes (e.g., clients) in order to perform work. In some embodiments, the determination of whether to grant a particular service request and/or the determination of pricing for servicing the request may be dependent on whether dedicated resources and/or shared resources within the resource pool are available for servicing the request. For example, in some embodiments, a portion of a resource pool may be reserved for the exclusive use of (or on behalf of) a client (e.g., as a collection of dedicated resource instances), and the client may be charged for the total amount of reserved resources (i.e., their reserved capacity) on a flat-fee basis for a given period of time, regardless of the amount of the reserved capacity that is actually being used by the customer at any given point during that period time.

In some embodiments, if the client submits a service request that would require the use of resources in excess of the reserved capacity (or the currently available portion of the reserved capacity), the request may be satisfied using other resources within the resource pool that are not currently being used (by any client) and that are made available by the system to service bursts of client requests beyond those that can be satisfied using the reserved resources of the client. As used herein, the term "burst capacity" may collectively refer to these other resources and/or to the amount of these resources (e.g., the number of resource instances that within the resource pool that are not currently being used by any client and that are made available by the system to service bursts of client requests). In some embodiments, the pricing model applied when a client request is serviced using resources within the burst capacity may be different than the pricing model that is applied when a client request is serviced using resources within the reserved capacity (i.e., the resources that are dedicated for the use by, or on behalf of, the client).

In one example, a computer system may be configured to provide database services or other data storage services to multiple clients (e.g., the clients may be subscribers to a service, or client applications that perform operations on behalf of subscribers to a service). In this example, a client may submit a request to the system to receive database or data storage services and the request message may include an indication of a desired throughput capacity that the client wishes to reserve. The request message (or a subsequent request message) may also include an indication of whether the client wishes to have access to excess throughput capacity for bursts of requests that might otherwise require more IOPS (e.g., read and/or write operations per second) than are available within the client's reserved throughput capacity. In this example, as long as the client does not attempt to perform more read and/or write operations per second than can be serviced using their reserved capacity, the system may be configured to service all of the requests received from the client from with their reserved capacity.

In this example, if the client requests access to burst throughput capacity, and if the client subsequently attempts to perform more read and/or write operations per second than can be serviced using their reserved capacity, rather than throttling any excess requests (e.g., those requests requiring more throughput capacity than has been reserved, or those requests received after the reserved capacity has been exhausted or after it is clear that the reserved capacity will be exhausted before they can be serviced), the system may be configured to apply additional resources (i.e., throughput capacity beyond the reserved throughput capacity), if available, in order to satisfy the excess requests.

In some embodiments, the system may be configured to determine pricing for servicing client requests, and the system may apply different pricing models to requests that are serviced using burst capacity and requests that are serviced using reserved capacity. In some embodiments, the average price for servicing a request to perform a database or data storage operation (or for performing an individual read or write operation thereof) using burst capacity is higher than the average price for servicing a request to perform a database or data storage operation (or for performing an individual read or write operation thereof) using the client's reserved capacity. For example, in one embodiment, the client may be charged a flat fee for servicing any number of requests that can be serviced using their reserved capacity, and may be charged additional fees for servicing excess requests using burst capacity (e.g., on a per-request basis, or on a per-input/output operation basis, i.e., per read or write operation). In some embodiments, pricing for servicing excess requests may be determined for each individual request (or input/output operation thereof), while in other embodiments pricing for servicing excess requests may be determined for collections of excess requests (e.g., a fixed or demand-based price may be determined for every 1000 excess requests have been serviced or 1000 excess input/output operations have been performed in a given time period).

In some embodiments, the techniques described herein for determining whether to service excess requests and/or for determining pricing to be applied to various requests serviced using reserved capacity and/or burst capacity may be performed by a component of the system that performs admission control and/or throttling of incoming requests (e.g., an admission control module or subsystem). In such embodiments, excess requests that might otherwise have been throttled by the admission control subsystem may be accepted and serviced if the client from which they were received (or on whose behalf they were received) has requested or negotiated for access to burst capacity, in accordance with an applicable burst pricing model.

One embodiment of a method for handling service requests received from a client is illustrated by the flow diagram in FIG. 1. In this example, it is assumed that the client has requested and been granted (or otherwise negotiated) access to an amount of a pooled resource (e.g., database connections, CPU cycles, heap memory, throughput capacity, or another type of pooled resource) reserved for use in servicing requests made by or on behalf of the client (i.e., reserve capacity). In other words, it is assumed that the client has access to reserved capacity for a resource usable in satisfying the types of service requests received by the system (e.g., various computing and/or storage services). In this example, the client may or may not also have access to additional amounts of the pooled resource (beyond the reserved capacity), i.e., burst capacity. As illustrated at 110, in this example, the method may include a computing system that provides services to clients receiving a service request from a client. If the amount of a resource needed to service the request does not exceed the capacity reserved for use in performing services on behalf of the client (i.e., if there is enough of the reserved capacity remaining to be able to service the request in light of other service requests that are currently being serviced or that were recently accepted for servicing), shown as the negative exit from 120, the method may include granting the request, as in 150. In this case, granting the request may in some embodiments include allocating the amount of the resource needed to perform the requested service from the resources reserved for the client (in other words, allocating the necessary resources from available resources within the reserved capacity for the client).

As illustrated in FIG. 1, if the amount of the resource needed to service the request exceeds the capacity reserved for the client (or a remaining portion thereof), the method may include determining whether there is sufficient burst resource capacity available to perform the requested service for this client, as in 130. For example, the method may include determining if the client has requested access to burst capacity, whether there is enough burst capacity available to service the request and/or whether the client is willing to pay for the required burst capacity at its current price. In some embodiments, if there is sufficient burst resource capacity available for use on behalf of this client to perform the requested service, the method may again include granting the request, as in 150. In this case, granting the request may in some embodiments include allocating the amount of the resource needed to perform the requested service from available pooled resources (e.g., resources that are available to satisfy bursts of requests that exceed reserved capacity), rather than from within the client's reserved capacity.

In either case (i.e., whether the request is satisfied using reserved capacity or burst capacity), granting the request may include determine pricing for servicing the request, dependent on the availability of reserved capacity and/or burst capacity, as in 160. As described in more detail herein, in some embodiments, different pricing models may be applied when servicing a request using the reserved capacity than when servicing a request using burst capacity. As illustrated in this example, if the amount of the resource needed to service the request exceeds the available reserved capacity and burst capacity is also not available (for whatever reason), the method may include denying the request, as in 140. For example, an error message may be returned to the client indicating that there is not a sufficient amount of the pooled resource remaining within the client's reserved capacity to satisfy the request; indicating that incoming requests will not be accepted and satisfied until (and unless) sufficient reserved capacity subsequently becomes available; indicating that incoming requests should be presented to the computing system at a reduced rate, or that they will be accepted and serviced at a reduced rate, e.g., indicating the throttling or incoming requests; and/or indicating that the client should retry the request at a later time in hopes that sufficient reserved capacity has become available.

In some embodiments, the systems described herein may provide mechanisms through which clients interact with the system to subscribe to various services and/or to configure various subscriber options. For example, a client may submit a request for computing services and/or storage services and may include in the request (or in one or more subsequent requests) values for various configuration parameters, including, but not limited to: a requested amount of reserved capacity for a pooled resource, a time period for which the reserved capacity is requested, an upper limit on the price the client is willing to pay for the reserved capacity, a request for access to burst capacity, an upper limit on the price the client is willing to pay for access to burst capacity, or a bid price for burst capacity.

In some embodiments, reserved capacity may be priced according to the number of resource instances that are dedicated for the use of the client for any given time period. In some embodiments, a client may be able to change the amount of reserved capacity that is dedicated to their use (e.g., requesting and/or negotiating for an increase or a decrease in their reserved capacity) after requesting and/or negotiating for an initial amount of reserved capacity. In such embodiments, a single (e.g., flat) fee may be charged for the use of the reserved capacity for a given time period (e.g., per hour, day, week, or month), and that fee may be adjusted up or down for a given time period if the client requests (and is granted) an increase or decrease in their reserved capacity. In some embodiments, the client may not be required to commit to an initially requested amount of reserved capacity for a long period of time (e.g., months or years). However, in some embodiments, if the client commits to paying for a fixed amount of reserved capacity (e.g., a fixed number of dedicated resource instances) for a longer period of time (e.g., on the order of months or years), a discounted pricing model may be applied. For example, in one embodiment, if a client commits to paying for a fixed amount of reserved throughput capacity (in terms of a number of IOPS) for one year, a discount on the order of 30% may be applied to the standard pricing for those resource instances (e.g., the sum of the prices that would be charged for those resources each week or month during one year). In this example, even steeper discounts may be applied when the client commits to paying for a fixed amount of reserved throughput capacity for multiple years. In some embodiments, a client may be able to add reserved capacity to that which they have committed to on a long-term basis, but may not be able decrease the amount of reserved capacity (or avoid paying for the reserved capacity) during the period of the commitment.

As previously noted, in some embodiments, clients may decide whether and/or when to request access to burst capacity for a pooled resource, and may be charged for burst capacity using a different pricing model than a pricing model that is applied when using reserved capacity of that pooled resource. In other words, instead of denying or throttling requests from a client that would result in exceeding the client's reserved capacity, the system may be configured to satisfy the requests using burst capacity, if available. In some embodiments, a client who requests and/or authorizes the use of burst capacity to satisfy one or more requests may be subject to a spot market price or a fixed price for each such request (i.e., for each request that requires resources that exceed the currently available reserved capacity). For example, in some embodiments, if the system has a lot of idle resource capacity (e.g., because clients are not using all of the capacity they have reserved) and if demand for burst capacity is low (e.g., when there are not many requests to access burst capacity), burst capacity may be offered to clients at a relatively low price per request. However, if the system is running with high resource utilization, burst capacity may be offered to clients using a different pricing model (e.g., a spot market pricing model). Similarly, while pooled resources are in high demand (e.g., when there are a large number of requests to access burst capacity), burst capacity may be offered to clients at a relatively high price.

In some embodiments that utilize spot market pricing or other demand-based pricing, clients may be able to specify a bid price for access to burst capacity (e.g., in a spot-market-based dynamic pricing model) and/or an upper limit on the price they are willing to pay for burst capacity (in a demand-based dynamic pricing model). In such embodiments, if a client's reserved capacity is exhausted (or would be prior to satisfying an incoming request), the system may be configured to accept and service requests using burst capacity only if the current price does not exceed the upper limit set by the client and/or if the current threshold for accepting bids for burst capacity is less than the bid amount.

Figure 2:
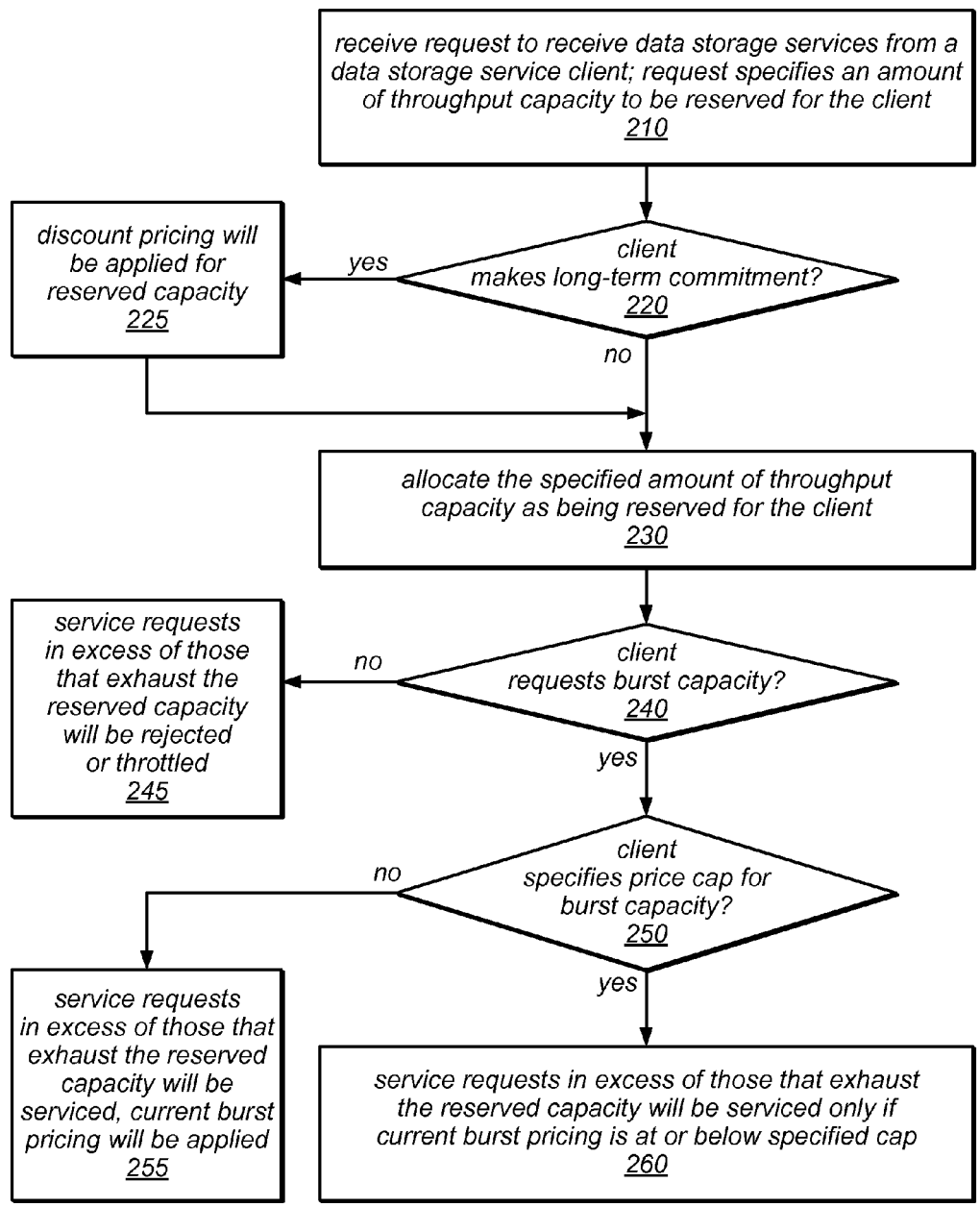
FIG. 2 is a flow diagram illustrating one embodiment of a method for establishing data storage services for a client.

One embodiment of a method for establishing data storage services for a client is illustrated by the flow diagram in FIG. 2. As illustrated at 210, in this example, the method may include a system that provides data storage services to clients receiving a request to receive data storage services from a data storage service client. In some embodiments, the request may specify an amount of throughput capacity to be reserved for the client. In other embodiments, this information may be specified in one or more other messages exchanged between the client and the service, or a system-wide or client-specific default amount of throughput capacity may initially be reserved for the client. As illustrated in this example, if the client makes a long-term commitment to the data storage service, shown as the positive exit from 220, the system may apply discount pricing to the throughput capacity that is reserved for the client, as in 225. For example, in some embodiments, the client may specify a term for which a specified amount of dedicated input/output capacity (e.g., a specified number of IOPS) is desired, and a flat (fixed) fee to be charged for the collective use of any or all of that dedicated throughput capacity during the specified term may be dependent on the length of that term, as described above. If the client does not make a long-term commitment to the data storage service, shown as the negative exit from 220, the method may not include the application of such a discount. In other words, the flat (fixed) fee to be charged for the collective use of those dedicated resources during the specified term may be based on a standard fee schedule, rather than a discounted fee schedule. As illustrated in this example, whether or not the client makes a long-term commitment to the data storage service, the method may include allocating the specified amount of reserved throughput capacity for use on behalf of the client (i.e., provisioning that capacity as reserved capacity for the client), as in 230.

As described herein, in some embodiments, a client may request and/or register to receive bursting services, i.e., the opportunity to access throughput capacity in excess of its reserved capacity from time to time, when excess capacity is available. As noted above, a desire to receive bursting services may be specified by the client when establishing data storage services for the client (e.g., as a parameter of a message requesting data storage services, or in a separate request to receive bursting services), in different embodiments. In the example illustrated in FIG. 2, if the client does not request access to burst capacity, shown as the negative exit from 240, service requests in excess of those that exhaust the reserved capacity may be rejected or throttled, as in 245. For example, if there is enough of the reserved throughput capacity remaining to be able to service an incoming request in light of other service requests that are currently being serviced or that were recently accepted for servicing, and the client does not have access to burst capacity, an error message may be returned to the client indicating that there is not a sufficient amount of throughput capacity remaining to satisfy the request, indicating that incoming requests will not be accepted and satisfied until (and unless) sufficient reserved throughput capacity subsequently becomes available, indicating that incoming requests should be presented to the data storage system at a reduced rate or that they will be accepted and serviced at a reduced rate, and/or indicating that the client should retry the request at a later time in hopes that sufficient reserved throughput capacity has become available.

On the other hand, if the client requests access to burst capacity, shown as the positive exit from 240, service requests in excess of those that exhaust the reserved capacity may in some cases be serviced. For example, if the client does not specify a price cap for burst capacity (i.e., an upper bound on what the client is willing to pay for excess capacity), shown as the negative exit from 250, service requests in excess of those that exhaust (or would exhaust) the reserved capacity may be serviced, and the current burst pricing (at the time at which the request is serviced) may be applied, as in 255. However, if the client specifies a price cap for burst capacity, shown as the positive exit from 250, service requests in excess of those that exhaust (or would exhaust) the reserved capacity may be serviced only if the current burst pricing is at or below the specified price cap, as in 260. As noted above, in some embodiments, a price cap (e.g., an upper limit on the price the client is willing to pay to service requests using burst capacity) may be specified when establishing data storage services for a client (e.g., as a parameter of a message requesting data storage services, or as a parameter of a separate request to request bursting services), in different embodiments. In some embodiments, the price cap may be modified by the client during operation. In other words, the client may be able to modify their price cap in response to changing conditions or priorities for getting their requests serviced. Note that while FIG. 2 illustrates a method employed in a system that provides data storage services to clients and that allocates throughput capacity for servicing client requests from a pool of throughput capacity, the techniques described above may also be applied in systems that provide other types of services using these or other types of pooled resources (e.g., database connections, CPU cycles, heap memory, etc.)

The techniques described herein for determining burst pricing for pooled resources may be further illustrated by the following examples. In one example, a client may have a reserved capacity of 1000 resource instances, meaning that at most 1000 resource instances in a resource pool may be consumed by (or on behalf of) the client at a given time or within a given time period. In this example, the system may be configured to charge a spot market price or a fixed price for each excess request received from (or on behalf of) the client that it services using burst capacity, i.e., for each request that, if serviced without the use of any burst capacity, would result in the client exhausting their reserved capacity without being able to satisfy the request. Note that in some embodiments, while the pricing model for servicing requests using burst capacity may include a separate fee for each such request, the client may be charged only after multiple requests have been serviced using burst capacity (i.e., the client may be charged for servicing each group of excess requests of a certain size).

In another example, a client that has access to a reserved throughput capacity of 100 writes per second may typically perform fewer than 100 writes per second. However, once in a while (e.g., for 30 minutes each day), the client may perform 500 writes per second. In this example, instead of the client needing to reserve (and the system having to provision) a reserved capacity of 500 writes per second all the time (or even during that short window of time), the system may be configured to allow the client to burst above their reserved capacity of 100 writes per second, but may charge the client for the additional write throughput capacity (e.g., the additional 400 writes per second during that short time window) on a per-request basis. In some embodiments, the system may determine burst pricing periodically (e.g., once per hour, day, or week) or after a pre-determined number of excess requests have been serviced using burst capacity. For example, for every million write operations that cause the client to exceed their reserved capacity and that are serviced successfully using burst capacity, the system may charge the client for those excess requests at a certain rate. In different embodiments, the rate charged for each of the additional write requests may be determined using a spot-market-based dynamic pricing model or another type of demand-based dynamic pricing model. In some embodiments, the system may charge a higher price per request for a large volume of excess requests than for a small number of excess requests (e.g., to encourage the client to increase their reserved capacity instead of relying on burst capacity, which may not always be available).

As previously noted, the price for servicing each of the excess requests may be higher than the reserved capacity equivalent (e.g., the average price per request for the requests that are serviced using reserved capacity). However, the ability for the client to access burst capacity in addition to their reserved capacity may allow the system to support increased client traffic when the client experiences expected or unexpected spikes without having to provision capacity for those excess requests ahead of time. Note also that in some embodiments of the data storage systems described herein, clients may be charged for data storage (e.g., according to an amount of reserved storage capacity they have requested or according to the amount of storage they actually use) in addition to being charged for throughput capacity (i.e., for read and/or write accesses targeting data stored on their behalf).

Figure 3:
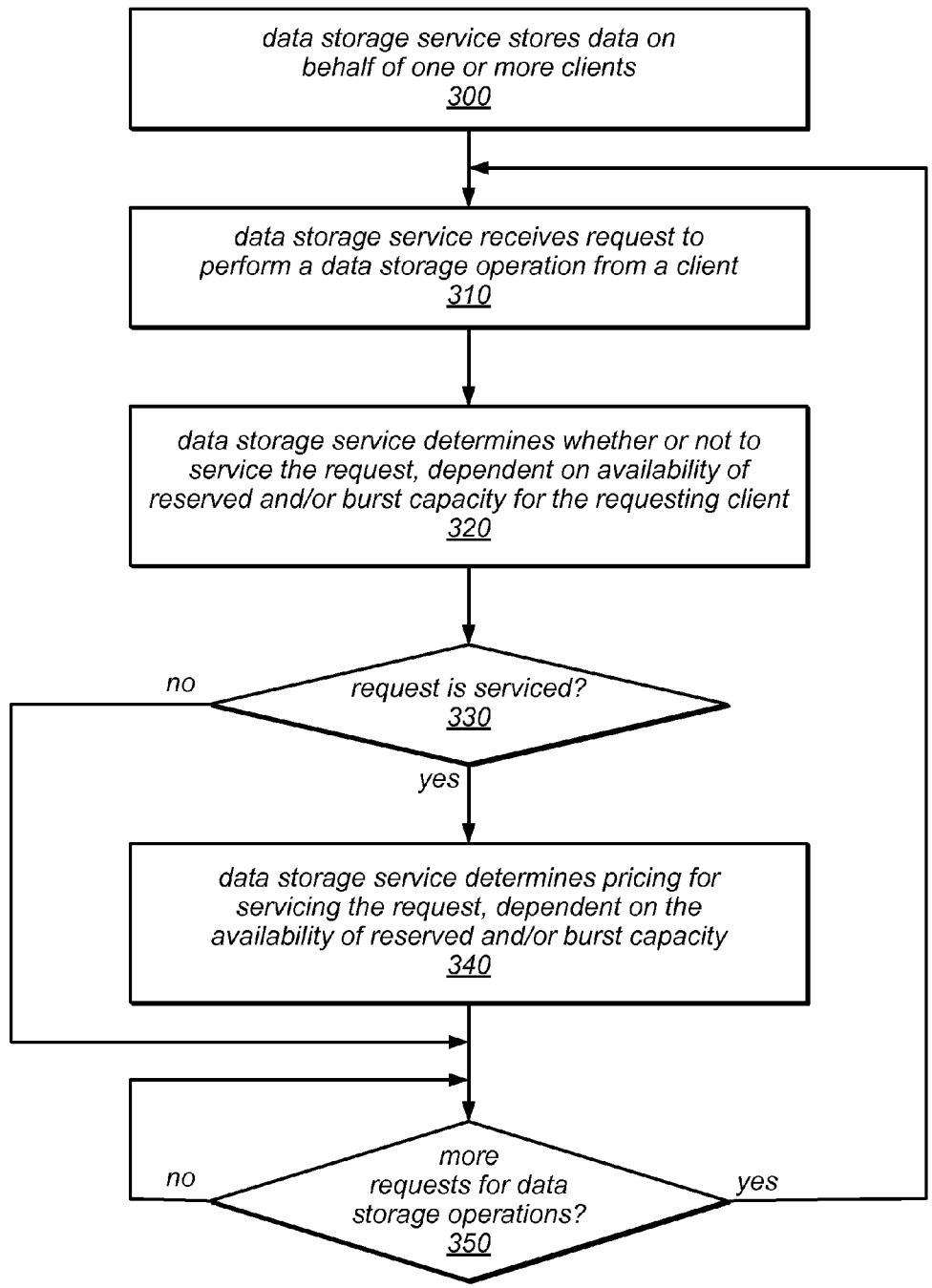
FIG. 3 is a flow diagram illustrating one embodiment of a method for handling requests to perform data storage operations received from a client.

One embodiment of a method for handling requests to perform data storage operations received from a client is illustrated by the flow diagram in FIG. 3. As illustrated at 300, in this example, the method may include a data storage service storing data on behalf of one or more clients. For example, the data storage service may receive data to be stored from the clients and may store the data on behalf of the clients in block storage or in one or more database tables, in different embodiments. The method may include the data storage service receiving, from a client, a request to perform a data storage operation (e.g., a read or write access operation targeting data stored on behalf of the client), as in 310. For example, the service may receive a request to put (store), get (retrieve), update, or delete one or more data entries in a table or a data object or block, in different embodiments. The method may include the data storage service determining whether or not to service the request, dependent on the availability of reserved capacity and/or burst capacity of a pooled resource required to perform the operation (e.g., the availability of read and/or write throughput capacity, in terms of IOPS, the availability of a database connection, or the availability of another pooled resource needed to satisfy the request) for the requesting client, as in 320. For example, if enough of the resource that was reserved for the client is available to use in satisfying the request, the data storage service may service the request. Similarly, if burst capacity is available to fulfill the request, and if the client has arranged to be able to take advantage of available burst capacity, the request may be serviced by the data storage service.

As illustrated in this example, if the request is serviced (shown as the positive exit from 330), the method may include the data storage service determining pricing for servicing the request, dependent on the availability of reserved capacity and/or burst capacity of the pooled resource, as in 340. As described herein, the pricing model for servicing the request using burst capacity may be different than for servicing the request using reserved capacity. For example, in some embodiments, the client may pay a fixed price to be able to access any portion of the amount of the pooled resource that was previously reserved for use in servicing the client's requests (e.g., for a pre-determined length of time), and may not be required to pay any additional fees for the use of any portion of the pooled resource in servicing the request, as long as this reserved capacity is not exhausted prior to satisfying the request. In some embodiments, if there is not sufficient reserved capacity to satisfy the request, the client may be required to pay additional fees for the use of a portion of the burst capacity in servicing the request. In some embodiments, pricing for the use of the burst capacity may be based on the number of requests that are serviced using the burst capacity (e.g., this may include an additional flat fee per request, once the reserved capacity is exhausted), rather than on the amount of the burst capacity that is used in servicing those requests. In some embodiments, the fee charged per request when servicing requests using burst capacity (e.g., when the amount of the pooled resource needed to satisfy the requests received from a client exceed the client's reserved capacity) may be based on current demand, such that the client is charged a higher price per request when demand for the burst capacity is heavy and is charged a lower price when excess burst capacity is plentiful.

Note that while FIG. 3 illustrates an embodiment in which determining pricing (shown at 340) is performed after determining that the request should be serviced (shown as 320), in other embodiments, these operations may be performed in the opposite order. In other words, in some embodiments, the price that would be charged for servicing a request may be determined prior to determining whether to service the request, and the determination of whether to service the request may be dependent on the determined price for doing so. For example, in embodiments in which the client has specified an upper limit on the price they are willing to pay to access burst capacity in order to satisfy a particular service request, the current burst pricing may be determined first, and the request may be service only if the current burst pricing is acceptable to the client (e.g., if it is below the client's specified price cap). In other embodiments, pricing for the use of the burst capacity may be based on a spot market model, as described in more detail below. In such embodiments, the client may bid for the use of any available burst capacity, and the data storage system may determine which, if any, of the requests it receives from one or more clients will be serviced using the burst capacity based on the client's bid. In embodiments in which determining the pricing that would be applied if the request is serviced influences the determination of whether the request will be serviced, the operation illustrated at 340 may be performed prior to (or in conjunction with) the operation illustrated at 320. In embodiments in which the determination of whether or not to service the request is performed without regard to the pricing that would be applied if the request is serviced (e.g., in embodiments in which the client has agreed to a pre-determined burst pricing model), the operation illustrated at 340 may not be performed until or unless the request is actually serviced. This is illustrated in FIG. 3 by the path from the negative exit of 330 to 350.

As illustrated in FIG. 3, if additional requests are received from this or another client to perform data storage operations, the method may include repeating the operations illustrated in 310-340 for each of one or more such additional requests. This is illustrated in FIG. 3 by the feedback from the positive exit of 350 to 310.

As previously noted, the systems described herein may in some embodiments support the use of burst resource capacity to satisfy client requests, and may apply a burst pricing model that is different from a pricing model applied to the use of reserved resource capacity. For example, in some embodiments, reserved capacity may be priced using a fixed price model that is dependent on the amount of capacity that is reserved (e.g., the number of resource instances dedicated for the use of a particular client), rather than on the amount of the reserved capacity that the client actually uses. On the other hand, burst capacity (which may be employed in addition to any reserved capacity) may be priced more dynamically, and may be dependent on the amount of burst capacity used and/or on the number of requests that use the burst capacity (on a per-resource-instance use or a per-excess-request basis), in some embodiments. For example, burst capacity pricing may be based on the current availability of burst resource capacity, on a fixed or spot market price per request, and/or on a bid price or price cap specified by a client.

Figure 4:
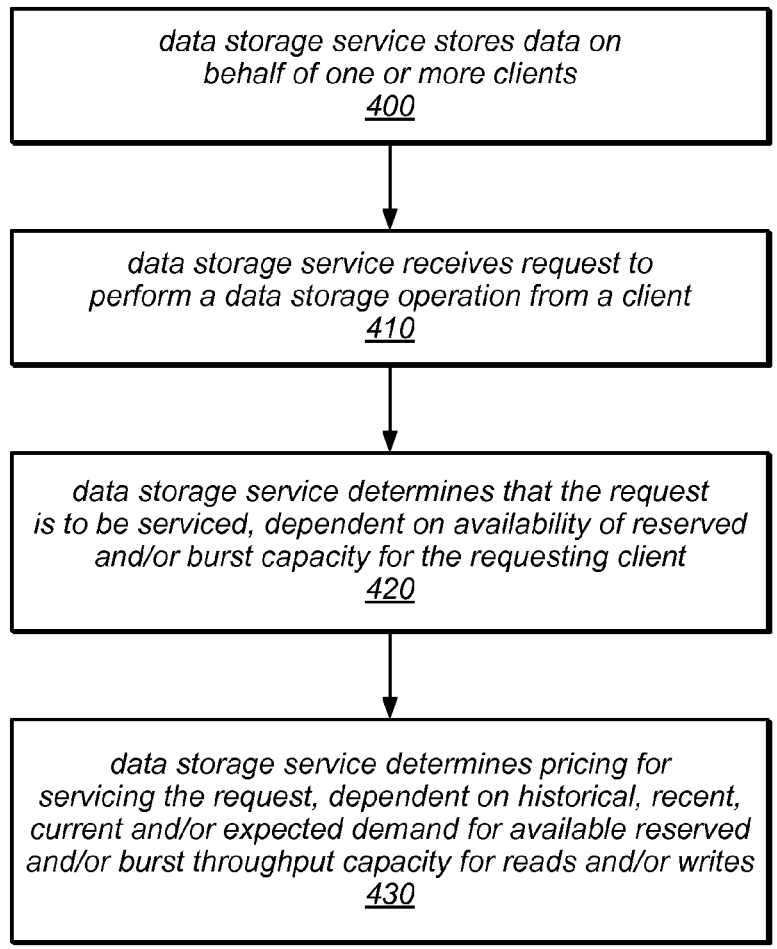
FIG. 4 is a flow diagram illustrating one embodiment of a method for a data storage service to grant a service request and to dynamically determine pricing for servicing the request.

One embodiment of a method for a data storage service to grant a request and to dynamically determine pricing for servicing the request is illustrated by the flow diagram in FIG. 4. As illustrated at 400, in this example, the method may include a data storage service storing data on behalf of one or more clients. In this example, while a pre-determined amount of a pooled resource needed to fulfill requests may be reserved for use in fulfilling requests from the client (e.g., the data storage service may have reserved a pre-negotiated throughput capacity), the cost of using that capacity may not necessarily be fixed. As illustrated in FIG. 4, the method may include the data storage service receiving (from a client) a request to perform a data storage operation, as in 410. For example, the data storage service may receive a request to put (store), get (retrieve), update, or delete one or more data entries in a table or a data object or block, in different embodiments. As in the previous example, the method may include the data storage service determining that the request is to be serviced, dependent on the availability of reserved capacity and/or burst capacity for the requesting client (shown as 420).

As illustrated at 430, in this example, the method may include the data storage service determining pricing for servicing the request, dependent on historical, recent, current and/or expected demand for available reserved throughput capacity and/or burst throughput capacity for reads and/or writes. For example, the price to be charged for servicing the request may be a price to be charged for collectively performing multiple IOPS (in order to satisfy the current request and/or multiple requests that include the current request), or a price to be charged per request (i.e., for the current request only). In some embodiments, the pricing may be dynamically adjusted for each request, for an upcoming slice of time (e.g., in response to a change in the reserved capacity or a change in another parameter affecting the use of reserved or burst capacity), in response to a demand-based trigger (e.g., in response to coming within a pre-determined percentage of the reserved or burst capacity being fully utilized), or based on other pricing criteria of a dynamic pricing model. Note that while FIG. 4 illustrates a method employed in a system that provides data storage services to clients and that allocates throughput capacity (e.g., IOPS) for servicing client requests from a pool of throughput capacity, the techniques described above may also be applied in systems that provide other types of services using these or other types of pooled resources (e.g., database connections, CPU cycles, heap memory, etc.)

In various embodiments, any or all of the techniques described herein for allocating reserved and/or burst capacity to the servicing of client requests and determining pricing for servicing those requests may be applied in a system that provides database services. One embodiment of a method for a database service to allocate capacity and/or adjust pricing in response to increased demand for services is illustrated by the flow diagram in FIG. 5. As illustrated in this example, the method may include a database service storing data in a plurality of tables on behalf of one or more clients (as in 500). The method may also include the database service receiving a request from a client to perform an operation targeting one of his or her tables, as in 510. For example, the service may receive a request from a client to put (store) an item, get (retrieve) one or more items having a specified key, delete an item, update the attributes in a single item, query for items using an index, and/or scan (e.g., list items) over a table, optionally filtering the items returned. If there is a sufficient amount of reserved capacity of a resource needed to service the request (e.g., reserved throughput capacity) available (shown as the positive exit from 520), the method may include the database service performing the requested operation, as in 525. As illustrated in this example, in some embodiments, if reserved capacity is used in servicing the request, there may be no additional charges for servicing this particular request (e.g., no charges beyond a pre-determined cost for making the reserved capacity available for use in performing database operation on behalf of the client).

In some embodiments, if there is not a sufficient amount of reserved capacity (e.g., reserved throughput capacity) available for servicing the request (shown as the negative exit from 520), but the client requests an increase in reserved capacity (shown as the positive exit from 530), the method may include the database service increasing the allocation of resources, i.e., throughput capacity, if available, and performing the requested operation, as in 535. For example, in some embodiments, if there is not a sufficient amount of reserved capacity available for servicing a request, the system may return a message to the client indicating that there is not a sufficient amount of reserved capacity available for servicing a request, and in response, the client may submit a message to the system requesting an increase in their reserved capacity. In this example, if there is sufficient un-reserved capacity remaining in the resource pool, the request for increased reserved capacity may be granted. As illustrated in this example, in some embodiments, increasing the reserved capacity may include applying an up-charge to cover the cost of the increased throughput capacity. In some embodiments, a client may be able to request increased throughput capacity for a specified period of time (e.g., the client may request a temporary increase in their throughput capacity). Note that in some embodiments, the client may also be able to request decreased throughput capacity for a specified period of time (e.g., the client may request a temporary decrease in their throughput capacity), which may result in a decreased charge for their reserved capacity while the change stands. In some embodiments, any request to increase or decrease reserved capacity that is acted upon may be considered to be a permanent (or semi-permanent) change in the client's reserved capacity. For example, in some embodiments, any request to increase or decrease reserved capacity may result in a change in the reserved capacity that stands until or unless a subsequent request to change the amount of reserved capacity is received and acted upon.

Figure 5:
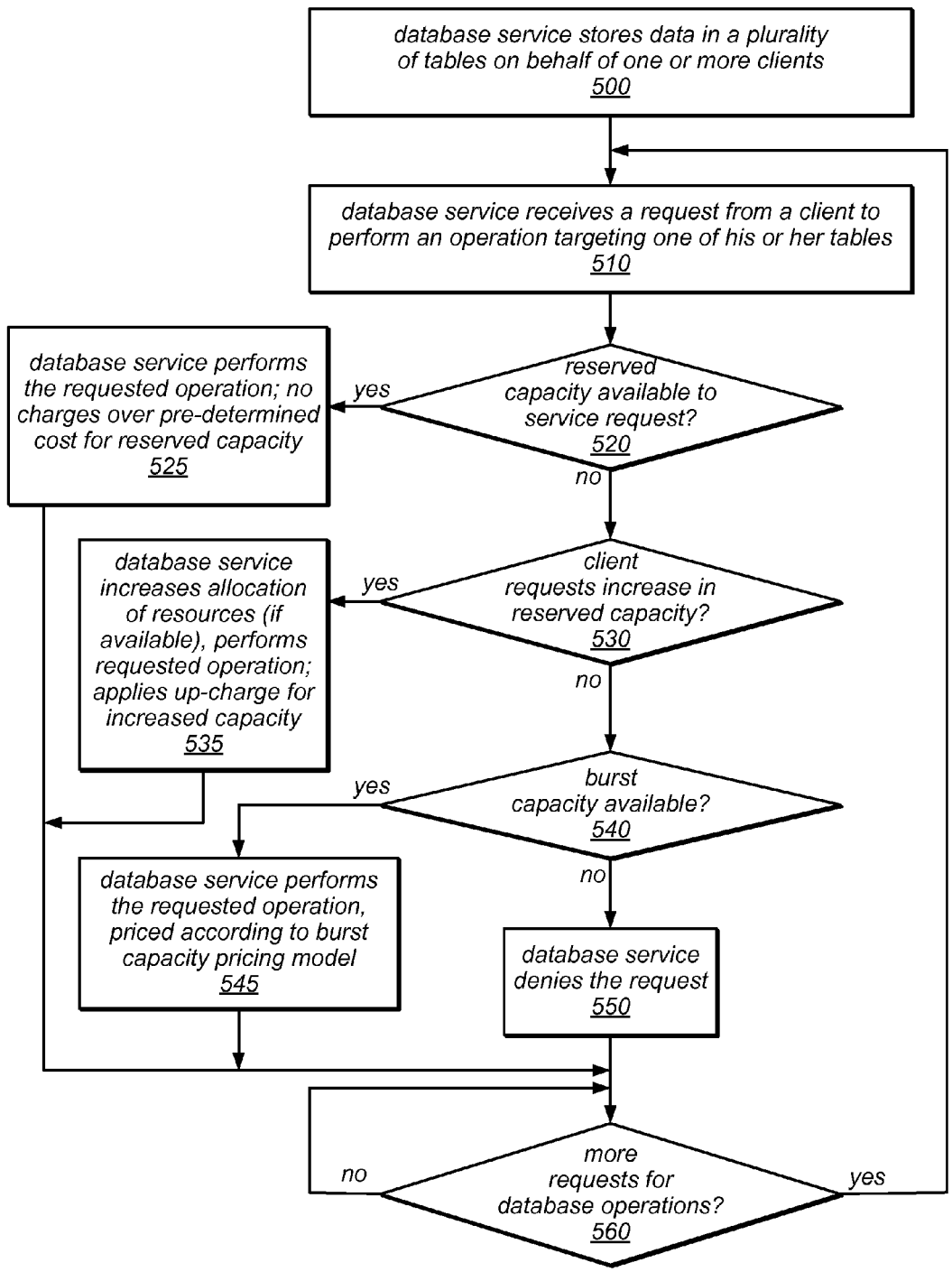
FIG. 5 is a flow diagram illustrating one embodiment of a method for a database service to allocate capacity and/or adjust pricing in response to increased demand for services.

As illustrated in FIG. 5, if the client does not request an increase in reserved capacity (shown as the negative exit from 530), but burst capacity is available for use in servicing the request (shown as the positive exit from 540), the method may include the database service performing the requested operation, which may be priced according to a current burst capacity pricing model, as in 545. For example, the method may include determining whether the client has requested access to burst capacity, whether there is enough burst capacity available to service the request and/or whether the client is willing to pay for the required burst capacity at its current price, and if so, performing the requested operation using burst capacity. However, if burst capacity is not available for use in servicing the request (shown as the negative exit from 540), the method may include the database service denying the request, as in 550. For example, an error message may be returned to the client indicating that there is not a sufficient amount of reserved and/or burst capacity remaining within the client's reserved capacity to satisfy the request, indicating that incoming requests will not be accepted and satisfied until (and unless) sufficient reserved and/or burst capacity subsequently becomes available, indicating that incoming requests should be presented to the computing system at a reduced rate or that they will be accepted and serviced at a reduced rate, and/or indicating that the client should retry the request at a later time in hopes that sufficient reserved and/or burst capacity has become available.

As illustrated in this example, if the database service receives more requests for database operations from the same client or from another client (shown as the positive exit from 560), the method may include repeating the operations illustrated as 510-550 for each of one or more additional requests. This is illustrated in FIG. 5 by the feedback from the positive exit of 560 to 510.

As previously noted, in some embodiments a spot-market-based pricing model may be applied when servicing client requests using burst resource capacity (e.g., spot resource instances) rather than their reserved resource capacity (e.g., dedicated, pre-priced resource instances). In some embodiments, a spot pricing model may apply a minimum spot price to all resource requests, regardless of the specific level of demand with respect to the supply (e.g., the total or remaining capacity of the resource pool). This minimum spot price may in some cases be reflective of operating costs for the resource pool. However, simply setting the spot price to a minimum value may not provide much information to the client other than that demand is probably less than supply. In other embodiments, the systems described herein may apply a pricing model to spot resource instances that takes into consideration the actual supply and demand (whether or not there is contention for resources). In other words, these systems may calculate the spot price as a function of supply and demand. For example, in some embodiments, these systems may be configured to calculate the spot price as a function of the remaining available resource instances and a prediction of a contention spot price, modeled on existing (e.g., running and open) bids. In some embodiments, a customer (or potential customer) may access data indicating recent spot prices for various resource pools (e.g., historical price curves for the last day, week, or month) and this information (which may more accurately reflect the changing relationships between supply and demand over the reported period than that provided by a system that employs standard spot pricing) may inform their bidding strategies.

In one example, a system that provides access to one or more pools of resources as part of a service may receive requests (e.g., from clients of the service) for resources from a particular resource pool, each of which includes a respective bid amount. The bid amount may represent the maximum price that the client (or requestor) is willing to pay to use the requested resource for a specific period of time (e.g., for input/output throughput capacity measured in terms of IOPS, or per resource instance hour). In some embodiments, an incoming service request may include an explicit request for a particular type and amount of a pooled resource (for an amount of heap memory or a number of database connections), while in other embodiments, an incoming service request may specify a request for the performance of an operation (e.g., a computation or a data storage operation), which may imply a request for the use of a particular type and amount of a pooled resource (e.g., CPU cycles or IOPS). Note that in various embodiments, the request may also include an identifier of the client (requestor), an identifier of a resource pool, an identifier the type of pooled resource (or resource instance) requested, an indication of the number of resource instances being requested, and/or other information.

In this example, the system may determine a current bid threshold below which resource requests will not be granted (i.e. the lowest bid amount for which corresponding ones of the requests for resources will be granted). In other words, the current bid threshold may represent the current spot price for an instance of the requested resource. In various embodiments, the determination of the current bid threshold may be dependent on (or calculated as a function of) the current supply of resources in the resource pool (which may include both reserved and un-reserved, or burst, capacity), the current demand for those resources, the existing requests (both pending requests and those that have been granted and for which resources are currently in use), and/or on the bid amounts included in those existing requests. In some embodiments, the determination of the current bid threshold may also be dependent on a minimum spot price (e.g., a minimum spot price based on operating costs in the system).

In this example, only requestors whose requests include a bid amount greater than or equal to the current bid threshold may be granted access to respective instances of those resources. Note that in some embodiments, the current spot price may be set equal to the current bid threshold amount, and this amount (rather than a bid amount included in a request) may be the price that requestors who are granted access to a requested resource pay for the use of that resource.

Note that in various embodiments, the techniques described herein for determining which and/or how many requests for resource instances are granted and/or terminated (e.g., denied and/or throttled) by the system (or service) as demand changes, and for determining the prices that clients will be charged for the use of those resource instances if and when their requests are granted may be applied to resource request data that is captured during a particular window in time, e.g., for a running collection of resource requests (e.g., those that have been received and are open and those that currently being serviced). In some such embodiments, information included in a collection of resource requests (e.g., an identifier of the client/requestor, an identifier of a resource pool, an identifier the type of resource instance being requested, an indication of the number of resource instances being requested, a bid amount, and/or other information) may be captured as the requests are received, and this data may be analyzed on a periodic basis to recalculate various bid thresholds and/or spot prices. For example, such an analysis may be performed once every minute or once every hour. In other embodiments, such an analysis may be performed in response to receiving a resource request, or in response to having received a pre-determined number of requests for reserved and/or burst resources in a particular resource pool. In some embodiments, bid thresholds and/or spot prices may be adjusted less frequently than the analysis is performed (e.g., no more often than once every five minutes or once per hour) regardless of how often an analysis of the request data is performed. In such embodiments, this may avoid excessive price thrashing during periods of non-contention.

Figure 6:
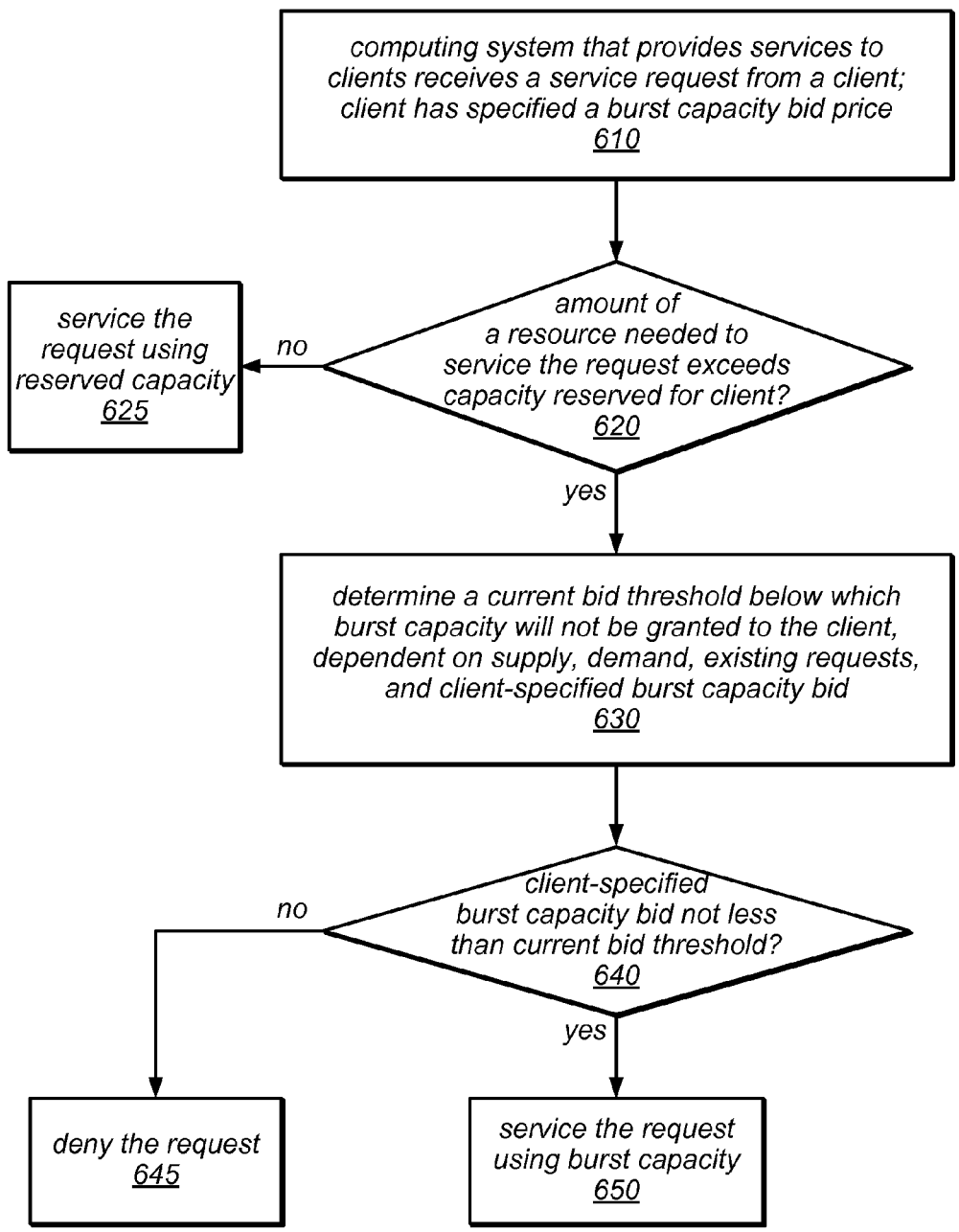
FIG. 6 is a flow diagram illustrating one embodiment of a method for allocating resources to a service request using a spot market pricing model.

One embodiment of a method for allocating resources to a service request using a spot market pricing model is illustrated by the flow diagram in FIG. 6. As illustrated at 610, in this example, the method may include a computing system that provides services to clients receiving a service request from a client. As illustrated in this example, the client may have specified a burst capacity bid price. For example, the client may have specified a request-specific bid price for burst capacity in the service request or may have specified a default bid price for all service requests through a prior agreement (e.g., when signing up for burst services). In some embodiments, an initial or default bid price that is specified at the time burst services are requested and/or established (or specified at a later time in a separate request) may be subsequently overridden by the client later (e.g., in response to changing conditions or priorities for getting their requests serviced). If the amount of a resource needed to service the request does not exceed the amount of the resource that was reserved for client (e.g., if enough of the reserved capacity is available to service the request), the method may include the computing system servicing the request using resources within the reserved capacity. This is illustrated in FIG. 6 by the path from the positive exit of 620 to 625.

As illustrated in this example, in some embodiments, if the amount of the resource needed to service the request exceeds the amount reserved for client (e.g., if not enough of the reserved capacity is available to service the request), the method may include the computing system determining a current bid threshold below which burst capacity will not be granted to the client, dependent on supply, demand, existing requests, and a client-specified burst capacity bid, as in 630. If the client-specified burst capacity bid is not less than the current bid threshold (e.g., the threshold determined as in 630), the method may include the computing system servicing the request using at least a portion of the available burst capacity. This is illustrated in FIG. 6 as the path from the positive exit of 640 to 650. However, if the client-specified burst capacity bid is less than the current bid threshold (e.g., the threshold determined as in 630), the method may include the computing system denying the request, as in 645. For example, an error message may be returned to the client indicating that there is not a sufficient amount of reserved and/or burst capacity remaining within the client's reserved capacity to satisfy the request, indicating that incoming requests will not be accepted and satisfied until (and unless) sufficient reserved and/or burst capacity subsequently becomes available, indicating that incoming requests should be presented to the computing system at a reduced rate or that they will be accepted and serviced at a reduced rate, indicating that the client-specified burst capacity bid is less than the current bid threshold, and/or indicating that the client should retry the request at a later time in hopes that sufficient reserved and/or burst capacity has become available. In some embodiments, in response to feedback from the system indicating that the amount of the resource needed to service the request exceeds the amount reserved for client and/or that the client-specified burst capacity bid is less than the current bid threshold, the client may submit a message to the system specifying a burst capacity bid that that is not less than the current threshold (e.g., in a re-submitted service request message or in another message submitted in order to establish or modify an initial or default burst capacity bid).

As previously noted, the techniques described herein for allocating reserved and/or burst capacity to the servicing of client requests and determining pricing for servicing those requests may be applied in a system that provides database services (e.g., a data storage system in which data is stored in one or more tables on behalf of one or more clients). In other embodiments, any or all of these techniques may also be applied in systems that provide block storage services to clients. In one example, a data storage system may offer storage in one or more disk volumes, each provisioned to provide a reserved throughput capacity of 10,000 IOPS. In this example, the data storage system may allow a client to exceed this reserved throughput capacity (e.g., using any idle throughput capacity) and may determine a price for the use of that burst capacity by applying an alternate pricing model (e.g., a spot-market-based pricing model, or another type of demand-based dynamic pricing model). In general, the techniques described herein for allocating reserved and/or burst capacity to the servicing of client requests and for determining pricing for servicing those requests may be applied in any system that provides access to resources from a resource pool and that includes a capacity throttling mechanism for governing the allocation and use of those pooled resources.

Note that each of the techniques described herein may be employed independently and/or in various combinations, in different embodiments. For example, systems that provide services to clients (including access to pooled computing resources and/or data storage resources) and that receive, accept, and/or service requests on behalf of those clients may implement any or all of the techniques described herein for determining which and how many requests for resource instances are granted and/or terminated by the system (or service) as demand changes, and for determining the price that clients will be charged for the use of those resource instances if and when their requests are granted, in any combinations. As described herein, these systems may select one of a plurality of pricing models when determining pricing for requests that are (or that might be) serviced, depending on whether those requests are (or are predicted to be) serviced using reserved resource capacity or burst resource capacity. In some embodiments, the selection of one of the pricing models may also be dependent on various initial, default, or client-specified service parameter values, as described herein.

In some embodiments, a distributed database system that employs some or all of the techniques described herein for allocating reserved and/or burst capacity to the servicing of client requests and determining pricing for servicing those requests may support seamless scaling of user tables in a "fully shared nothing" type architecture. For example, in some embodiments, each database partition in the distributed system may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. In some embodiments, live repartitioning (whether programmatic/automatic or explicitly initiated) may be employed to adapt to workload changes. In other words, in some embodiments, repartitioning (including partition moving, partition splitting, and other repartitioning operations) may be performed while service requests directed to the affected partitions continue to be received and processed (i.e. without taking the source partition off-line).

In some embodiments, a database service (and/or the underlying distributed database system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Note that in some embodiments, burst throughput capacity may be made available to clients who request it, as described above. Other types of services may support a committed work throughput model (with or without burst throughput capacity) and/or other throughput models, in different embodiments.

A database service or another type of data storage service (and underlying system) that provides a committed throughput offering may be configured to pre-allocate capacity and/or resources (e.g., reserved capacity and/or resources) for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. In some such embodiments, one or more excess requests may be satisfied using burst capacity, if it has been requested by the client and is available to satisfy the excess requests. Similarly, resources that are pre-allocated to other types of services to support a committed work throughput model may in some cases be underutilized (at least some of the time), but may provide the client/user with a predictable level of performance (e.g., in terms of availability and/or responsiveness). Here again, excess requests may be satisfied using burst capacity, in some embodiments and in some cases.

In some embodiments the distributed database systems described herein may support both a multi-tenant model and a single-tenant model. In some such embodiments, the client/user may indicate a preferred one of these tenancy models for a particular table through a parameter of a request to create the table. In other embodiments, a client/user may specify a default or initial tenancy model for all tables created and maintained on their behalf by the data storage service.

In some embodiments, the database or data storage services described herein (and/or their underlying systems) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes. These APIs may be called relatively infrequently (when compared to data plane APIs). In some embodiments, the control plane APIs provided by the service may be used to create tables, delete tables, and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API). In some embodiments, a common use model may be for a client to request an action (e.g., using a CreateTable API), and then to poll on its completion via the corresponding description API (e.g., DescribeTables).

In some embodiments, the systems described herein may provide APIs (e.g., additional control plane APIs) for requesting, specifying and/or modifying the amount of reserved capacity and/or burst capacity for pooled resources (e.g., database connections and/or input/output throughput capacity), and for specifying the values of various configuration parameters. For example, these APIs may take as input parameters values that specify a requested amount of reserved capacity for a pooled resource, a time period for which the reserved capacity is requested, an upper limit on the price the client is willing to pay for the reserved capacity, a request for access to burst capacity, an upper limit on the price the client is willing to pay for access to burst capacity, and/or an initial or default bid price for burst capacity, in different embodiments.

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over a whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request. In some embodiments, for operations with a fixed (known) amount of work, pricing for excess requests that are serviced using burst capacity may be determined on a per-request basis, while for operations that require a varying amount of work (e.g., queries for which the number of items returned may vary), pricing for excess requests that are serviced using burst capacity may be determined on a per-input/output operation basis (e.g., per read and/or write operation).

In some embodiments, the techniques described herein may be implemented by a system that provides access to pooled computing resources as a service. As described herein, clients of such a service may submit requests for the use of one or more instances of a computing resource (whether directly or indirectly) that include an indication of the maximum amount the client is willing to pay for the use of those resource instances. In some embodiments, the techniques described herein for determining how resource instances are allocated to the requesting clients (e.g., which requests to grant) and for determining the price that clients will be charged for the use of those resource instances (if and when their requests are granted) may be implemented by a Web server (or an admission control subsystem or other component thereof). In general, any or all of the techniques described herein for managing resource requests and pricing models on behalf of a pool of computing resources may be performed by and/or implemented in an admission control module that is a component of a Web server. In some embodiments, the described systems may provide services over the Internet. In other embodiments, these techniques may be performed by and/or implemented in an admission control module or a similar component of another type of system that provides services to clients, and that is configured to receive, accept, and/or requests for pooled resources on behalf of those clients.

Figure 7:
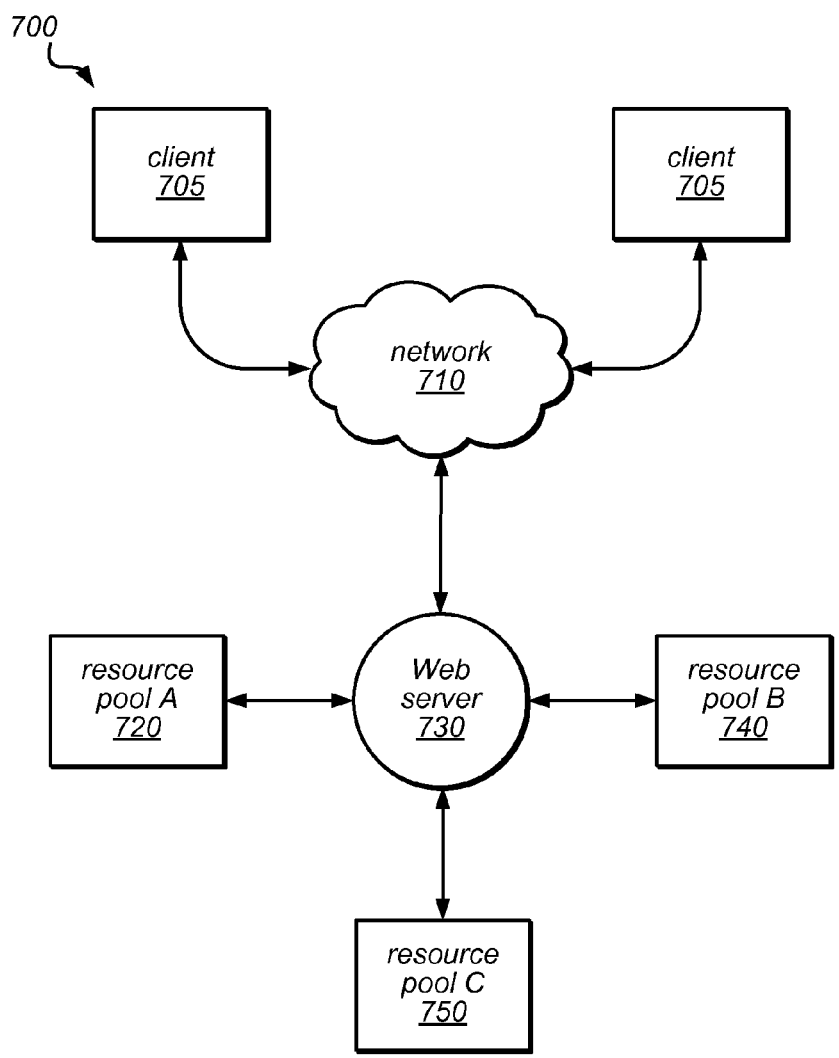
FIG. 7 is a block diagram illustrating components of a system that provides computing resources to clients, according to one embodiment.

For example, various techniques described herein may be employed in local or remote systems, including systems that provide computing services to clients (e.g., users or subscribers) over the Internet or over other public or private networks, such as virtual private networks and connections to services in a virtual private cloud (VPC) environment. FIG. 7 illustrates a block diagram of a system that provides various Web-based computing services (including access to pooled computing resources) to clients, according to one embodiment. In this example, system 700 includes one or more clients 705. In this example, the clients 705 may be configured to interact with a Web server 730 via a communication network 710.

As illustrated in this example, the Web server 730 may be configured to process requests from clients 705 for resource instances from various resource pools, such as resource pool A (720), resource pool B (740), and resource pool C (750), and to provide access to those resource instances to at least a portion of the clients 705 from within reserved portions of those pools or from excess (e.g., unreserved and/or idle) resource capacity (e.g., as a bursting service). In some embodiments, the different pools may include different types of computing resources (e.g., storage resources and/or computation resources), and/or computing resources having different capacities and/or performance specifications (e.g., resource instances that include different amounts of memory, different numbers of processor cores, processors with different levels of performance, different ratios between memory and CPU performance, and/or different amounts of storage available for customer use). As described herein, in various embodiments, resource requests received from clients 705 may include an identifier of the client (requestor), an identifier of a resource pool, an identifier the type of resource (or resource instance) requested, an indication of the number of resource instances being requested, a price cap, a bid amount, and/or other information. In some embodiments, a component of Web server 730 may be configured to determine whether a given resource pool, such as resource pool A, is operating in a non-contention state or a contention state, and to apply an appropriate pricing model to set the current bid threshold (or spot price) for the use of burst capacity accordingly (e.g., when reserved capacity within the resource pool has been exhausted). As described herein, requests that include (or are otherwise associated with) a bid amount that is not less the current bid threshold (or spot price) may be granted access to the requested resource instance(s).

In the example illustrated in FIG. 7, the clients 705 may encompass any type of clients configured to submit resource requests to Web server 730 via network 710 on behalf of a user (subscriber) or a requesting application. For example, a given client 705 may include a suitable version of a Web browser, or a plug-in module or other type of code module configured to execute as an extension to or within an execution environment provided by a Web browser. Alternatively, a client 705 may encompass an application such as a database application, media application, office application, or any other application that may make use of the services and/or computing resources provided by Web server 730. Requests submitted to Web server 730 by a client 705 may include requests to receive services (using reserved and/or burst capacity, according to various configuration parameter values) and/or requests to use reserved and/or burst resource capacity to perform various computations or data storage operations. In some embodiments, a client application may include sufficient protocol support (e.g., for a suitable version of Hypertext Transfer Protocol (HTTP)) for generating and processing Web service and/or resource requests without necessarily implementing full browser support for all types of Web-based data. That is, client 705 may be an application configured to interact directly with Web server 730. In various embodiments, client 705 may be configured to generate requests for Web services and/or computing resources according to a Representational State Transfer (REST)-style Web services architecture, a document or message-based Web services architecture, or another suitable Web services architecture. In some embodiments, client 705 may be configured to provide access to Web-based services and/or computing resources to other applications in a manner that is transparent to those applications. For example, a client 705 may be configured to integrate with an operating system to provide services and/or computing resources in accordance with a suitable variant of the service model described herein. However, the operating system may present a different service request interface to applications than that described herein.

In various embodiments, the communication network 710 may encompass any suitable combination of networking hardware and protocols necessary to establish Web-based communications between clients 705 and Web server 730. For example, the communication network 710 may generally encompass the various telecommunications networks and service providers that collectively implement the Internet. The communication network 710 may also include private networks such as local area networks (LANs) or wide area networks (WANs) as well as public or private wireless networks. For example, both a given client 705 and the Web server 730 may be respectively provisioned within enterprises having their own internal networks. In such an embodiment, the communication network 710 may include the hardware (e.g., modems, routers, switches, load balancers, proxy servers, etc.) and software (e.g., protocol stacks, accounting software, firewall/security software, etc.) necessary to establish a networking link between the given client 705 and the Internet as well as between the Internet and Web server 730. Note that in some embodiments, clients 705 may communicate with Web server 730 using a private network rather than the public Internet. For example, in some embodiments clients 705 may be provisioned within the same enterprise as the resources that provide various services and/or computing resources to those clients. In such a case, clients 705 may communicate with a server 730 entirely through a private communication network (not shown).

Figure 8:
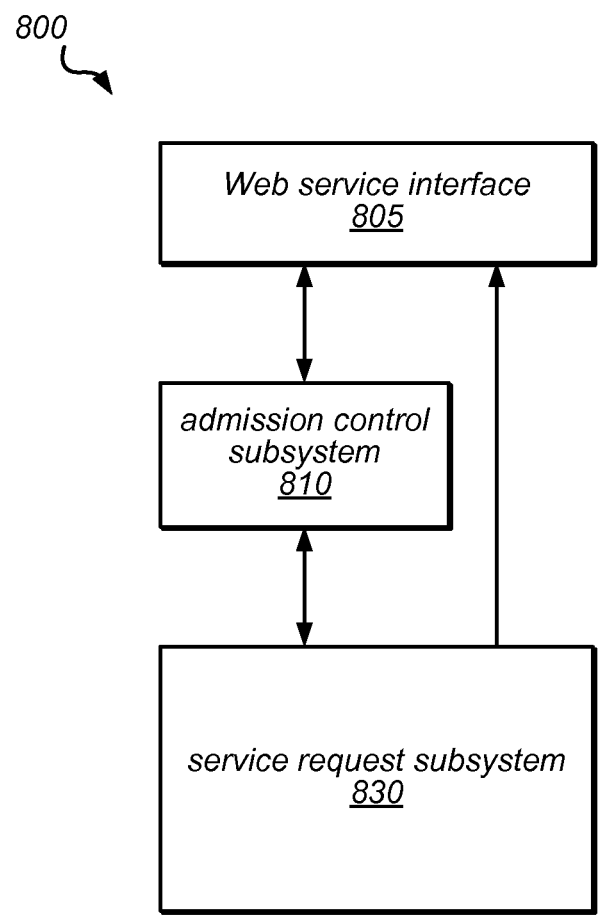
FIG. 8 is a block diagram illustrating subsystems of a system that provides computing resources to clients, according to one embodiment.

FIG. 8 is a block diagram illustrating a computing system 800 that provides various Web-based services and/or computing resources to clients, according to some embodiments. For example, in some embodiments, computing system 800 may implement a Web server, such as Web server 730 illustrated in FIG. 7. In various embodiments, computer system 800 may be configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by computing system 800 on behalf of various clients. As illustrated in this example, computing system 800 may include a Web service interface 805, an admission control subsystem 810, and a service request subsystem 830. In some embodiments, admission control subsystem 810 may be configured to monitor the state of various resource pools managed by a computing system 800, and may control which and how many requests for resource instances are granted and/or terminated by the system as demand changes. For example, any or all of the techniques described herein for allocating reserved and/or burst capacity to the servicing of client requests and for determining pricing for servicing those requests may be performed by admission control subsystem 810, in various embodiments.

In this example, Web services interface 805 may be configured to receive requests for computing services or data storage services (and/or the corresponding resources required to satisfy those service requests) from various clients and to communicate with admission control subsystem 810 to facilitate the performance of those services and/or allocation of those resources to at least a portion of the clients. For example, in some embodiments, admission control subsystem 810 may be configured to determine which and/or how many resource requests to accept from various clients, and may communicate this information to a service request subsystem 830. Service request subsystem 830 may in turn be configured to allocate (or initiate allocation of) one or more resource instances to client whose requests are granted, and to return an indication of the allocation (and/or results of the use of the computing resources) to the client via Web services interface 805. In some embodiments, admission control system 810 may make decisions about admission control based on one or more of the pricing models described herein. In some embodiments, Web service interface 805 may utilize pre-defined instructions or communications, such as via defined application protocol interfaces (APIs), to communicate with admission control subsystem 810 and/or other components of computing system 800 on behalf of a client.

In some embodiments, admission control subsystem 810 may be configured to determine whether the resource pools managed by computing system 800 are operating in a contention state or a non-contention state, and to apply different admission control policies or techniques (including, e.g., different pricing models for the use of burst capacity) in response to such a determination. For example, in response to determining that a resource pool is operating in a non-contention state, admission control subsystem 810 may be configured to determine a current bid threshold below which resource requests will not be granted, based at least in part on the current demand for resource instances, the current capacity of the reserved and/or burst capacity portions of the resource pool, the number of resource instances requested in existing requests, and/or the bid amounts included in those requests. In some embodiments, admission control subsystem may also be configured to terminate the use of one or more resource instances by a client in response to the current bid threshold being raised to a value higher than the bid amount included in that client's request for the one or more resource instances. In response to determining that a resource pool is operating in a contention state, admission control subsystem 810 may be configured to determine a current bid threshold below which resource requests will not be granted using any of a variety of contention pricing models including, but not limited to, those described herein.

Note that in various embodiments, the components illustrated in FIGS. 7 and 8 may be implemented directly within computer hardware, as instructions directly or indirectly executable by computer hardware (e.g., a microprocessor or computer system), or as a combination of these techniques. For example, the components of the computing system 800 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIG. 7 and/or FIG. 8.

It is contemplated that in some embodiments, any of the methods, techniques or components described herein may be implemented as instructions and data capable of being stored or conveyed via a computer-accessible medium. Such methods or techniques may include, for example and without limitation, various methods for determining which and how many requests for resource instances are granted and/or terminated by a computer system (or a service provided thereby) as demand changes, and for determining the price that clients will be charged for the use of those resource instances (within reserved capacity or burst capacity) if and when their requests are granted, as described herein. Such instructions may be executed to perform specific computational functions tailored to specific purposes (e.g., processing requests received via a Web services interface, or returning feedback and/or results of servicing various requests) as well as higher-order functions such as operating system functionality, virtualization functionality, network communications functionality, application functionality, storage system functionality, and/or any other suitable functions.

Figure 9:
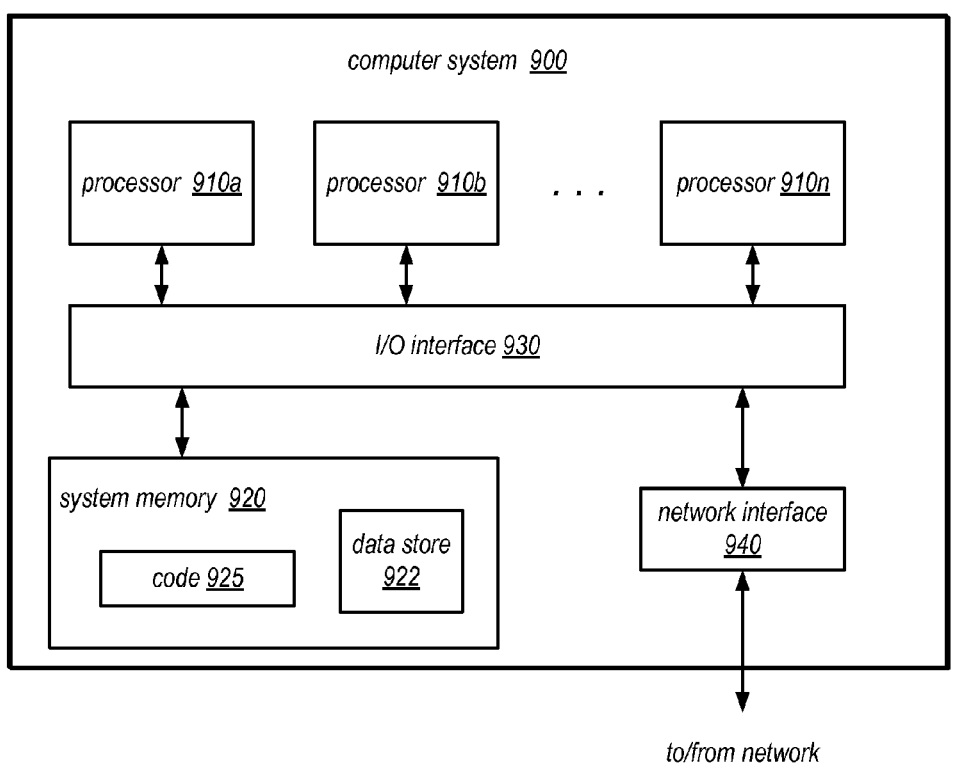
FIG. 9 illustrates one embodiment of a computer system that implements one or more of the techniques described herein.

One example embodiment of a computer system that includes computer-accessible media and that provides mechanisms for allocating reserved and/or burst capacity to the servicing of client requests and for determining pricing for servicing those requests is illustrated in FIG. 9. In various embodiments, the functionality of any of the various modules or methods described herein may be implemented by one or several instances of computer system 900. In particular, it is noted that different elements of the system described herein may be implemented by different computer systems 900. For example, a computer system that supports the functionality described herein for allocating reserved and/or burst capacity to the servicing of client requests and for determining pricing for servicing those requests may be implemented on the same computer system 900 on which a client (through which a customer/subscriber may access the system) executes, or on another computer system 900, in different embodiments. In another example, different subsystems (e.g., a Web service interface, an admission control subsystem, and a service request subsystem; or one or more load balancers, Web servers, and/or other components) may be implemented on or across multiple ones of the computing nodes, and each of the computing nodes may be similar to computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 910 may commonly, but not necessarily, implement the same ISA.

System memory 920 may be configured to store instructions (e.g., code 925) and data (e.g., in data store 922) accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for supporting allocating reserved and/or burst capacity to the servicing of client requests and for determining pricing for servicing those requests according to various mechanisms described herein), are shown stored within system memory 920 as code 925. It is noted that in some embodiments, code 925 may include instructions and data implementing desired functions that are not directly executable by processor 910 but are represented or encoded in an abstract form that is translatable to instructions that are directly executable by processor 910. For example, code 925 may include instructions specified in an ISA that may be emulated by processor 910, or by other code 925 executable on processor 910. Alternatively, code 925 may include instructions, procedures or statements implemented in an abstract programming language that may be compiled or interpreted in the course of execution. As non-limiting examples, code 925 may include code specified in a procedural or object-oriented programming language such as C or C++, a scripting language such as perl, a markup language such as HTML or XML, or any other suitable language.

In some embodiments, data store 922 within system memory 920 may store data representing various requests for resources, minimum bid amounts, theoretical bid thresholds, current bid thresholds, spot prices, resource specifications, resource pool parameters, client-specific price caps, initial or default bids, amounts of resource capacity reserved by various clients, and/or other data in various data structures suitable for implementing the techniques described herein.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may include a non-transitory, computer-readable storage medium configured to store instructions and data as described above. However, in other embodiments, instructions and/or data may be received, sent or stored upon different types of computer-accessible storage media. Generally speaking, a computer-accessible storage medium may include non-transitory storage media or memory media such as magnetic or optical media, e.g., disk or CD/DVD-ROM coupled to computer system 900 via I/O interface 930. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 900 as system memory 920 or another type of memory. A computer-accessible storage medium may generally be accessible via transmission media or signals such as electrical, electromagnetic, or digital signals, conveyed via a communication medium such as a network and/or a wireless link, such as may be implemented via network interface 940.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:
1. A system, comprising:
one or more hardware processors; and
a memory coupled to the one or more hardware processors and storing program instructions that when executed by the one or more hardware processors cause the one or more hardware processors to implement an admission control subsystem for controlling access to a pooled computer-based resource, wherein the pooled computer-based resource comprises one or more of a pool of database connections, a pool of CPU cycles, a pool of heap memory, or a pool of input/output operations per second, the admission control subsystem configured to:

associate a pre-determined amount of resource capacity of a pooled computer-based resource with a client as reserved resource capacity of the computer-based resource for the client;

associate a client-specified amount of burst resource capacity of the pooled computer-based resource with the client,
wherein burst resource capacity comprises resource capacity in excess of the reserved resource capacity of the computer-based resource;

receive a plurality of service requests from the client; and for at least one of the plurality of service requests:
determine that an amount of the pooled computer-based resource needed to service the service request exceeds a remaining portion of reserved resource capacity of the computer-based resource for the client;
determine whether the client has access to sufficient burst resource capacity of the pooled computer-based resource to service the service request;
based at least in part on the client not having access to sufficient burst resource capacity, throttle the service request in excess of those that exhaust the reserved capacity; and
based at least in part on the client having access to sufficient burst resource capacity,
grant the service request such that the service request is serviced by the pooled computer-based resource.

2. The system of claim 1, wherein pricing for the service request is based, at least in part, on whether the service request is serviced using the reserved resource capacity or burst resource capacity.

3. The system of claim 1,
wherein to determine whether the client has access to sufficient burst resource capacity to service the service request the instructions cause the admission control subsystem to determine that the client has requested access to burst resource capacity.

4. The system of claim 1,
wherein to determine whether the client has access to sufficient burst resource capacity to service the service request the instructions cause the admission control subsystem to determine that a current price for burst resource capacity is not greater than a pre-determined upper bound on burst resource capacity pricing for the client.

5. The system of claim 1,
wherein to determine whether the client has access to sufficient burst resource capacity to service the service request the instructions cause the admission control subsystem to determine that a pre-determined bid amount for burst resource capacity for the client is not less than a threshold bid amount for burst resource capacity pricing.

6. The system of claim 1,
wherein to determine whether the client has access to sufficient burst resource capacity to service the service request the instructions cause the admission control subsystem to determine that a sufficient amount of the pooled resource capacity in excess of the reserved resource capacity is available for servicing the service request.

7. The system of claim 1,
wherein when executed by the one or more processors, the program instructions further cause the one or more processors to determine pricing for a portion of the plurality of service requests that are serviced using the reserved resource capacity, wherein determine pricing includes:
determine a single price for collective use of the reserved resource capacity by two or more service requests that are serviced using the reserved resource capacity; and
determine a respective price for each of the service requests that are serviced using burst resource capacity.

8. The system of claim 1,
wherein when executed by the one or more processors, the program instructions cause the one or more processors to implement a data storage service that stores data on behalf of one or more clients; and
wherein each of the plurality of service requests comprises a request to perform an operation to retrieve data stored by the data storage service on behalf of the client or an operation to store data on behalf of the client.

9. The system of claim 1,
wherein when executed by the one or more processors, the program instructions cause the one or more processors to control access to computing services for one or more clients; and
wherein each of the plurality of service requests comprises a request to perform a computation on behalf of the client.

10. The system of claim 1,
wherein the pooled resource comprises throughput capacity for interactions between the client and a service provided by the system; and
wherein the reserved resource capacity comprises a pre-determined number of input/output operations per second.

11. The system of claim 1,
wherein the reserved resource capacity comprises a pre-determined number of read operations per second.

12. The system of claim 1,
wherein the reserved resource capacity comprises a pre-determined number of write operations per second.

13. The system of claim 1,
wherein the pooled resource comprises pooled computational resources; and
wherein the reserved resource capacity comprises a pre-determined portion of the pooled computational resources.

14. A non-transitory, computer-readable storage medium storing program instructions that when executed on one or more computers cause the one or more computers to:
associate a pre-determined amount of resource capacity of a pooled computer-based resource with a client as reserved resource capacity of the computer-based resource for the client, wherein the pooled computer-based resource comprises one or more of a pool of database connections, a pool of CPU cycles, a pool of heap memory, or a pool of input/output operations per second;

associate a client-specified amount of burst resource capacity of the pooled computer-based resource with the client, wherein burst resource capacity comprises resource capacity in excess of the reserved resource capacity of the computer-based resource;

receive a plurality of service requests from the client; and for at least one of the plurality of service requests:
- determine that an amount of the pooled computer-based resource needed to service the service request exceeds a remaining portion of reserved resource capacity of the computer-based resource for the client;
- determine whether the client has access to sufficient burst resource capacity of the pooled computer-based resource to service the service request;
- based at least in part on the client not having access to sufficient burst resource capacity, throttle the service request in excess of those that exhaust the reserved capacity; and
- based at least in part on the client having access to sufficient burst resource capacity,
  - grant the service request such that the service request is serviced by the pooled computer-based resource.

15. The non-transitory, computer-readable storage medium of claim 14, wherein to determine whether the client has access to sufficient burst resource capacity to service the service request the instructions cause the one or more computers to determine that the client has requested access to burst resource capacity.

16. The non-transitory, computer-readable storage medium of claim 14,
wherein when executed by the one or more computers, the program instructions cause the one or more computers to implement a data storage service that stores data on behalf of one or more clients; and
wherein each of the plurality of service requests comprises a request to perform an operation to retrieve data stored by the data storage service on behalf of the client or an operation to store data on behalf of the client.

17. A method, comprising
performing, by one or more computers comprising respective hardware processors and memory:
- associating a pre-determined amount of resource capacity of a pooled computer-based resource with a client as reserved resource capacity of the computer-based resource for the client, wherein the pooled computer-based resource comprises one or more of a pool of database connections, a pool of CPU cycles, a pool of heap memory, or a pool of input/output operations per second;
- associating a client-specified amount of burst resource capacity of the pooled computer-based resource with the client, wherein burst resource capacity comprises resource capacity in excess of the reserved resource capacity of the computer-based resource;
- receiving a plurality of service requests from the client; and
- for at least one of the plurality of service requests:
  - determining that an amount of the pooled computer-based resource needed to service the service request exceeds a remaining portion of reserved resource capacity of the computer-based resource for the client;
  - determining whether the client has access to sufficient burst resource capacity of the pooled computer-based resource to service the service request; and
  - throttling, based at least in part on the client not having access to sufficient burst resource capacity, the service requests in excess of those that exhaust the reserved capacity.

18. The method of claim 17, further comprising:
implementing a data storage service that stores data on behalf of one or more clients; and
wherein each of the plurality of service requests comprises a request to perform an operation to retrieve data stored by the data storage service on behalf of the client or an operation to store data on behalf of the client.

19. The method of claim 17, further comprising:
providing computing services to one or more clients; and
wherein each of the plurality of service requests comprises a request to perform a computation on behalf of the client.

20. The method of claim 17,
wherein the pooled resource comprises throughput capacity for interactions between the client and a service provided by a service provider; and
wherein the reserved resource capacity comprises a pre-determined number of input/output operations per second.

* * * * *